United States Patent [19]

Mason et al.

[11] Patent Number: 4,759,109
[45] Date of Patent: Jul. 26, 1988

[54] VARIABLE ANGLE RIVETER

[75] Inventors: Jack W. Mason, Grand Prairie; Michael Blanc, Fort Worth, both of Tex.

[73] Assignee: LTV Aerospace & Defense Company, Dallas, Tex.

[21] Appl. No.: 930,745

[22] Filed: Nov. 13, 1986

[51] Int. Cl.[4] .............................................. B23P 11/00
[52] U.S. Cl. .................................. 29/243.54; 29/509; 29/524.1; 227/51
[58] Field of Search ................ 29/509, 522 A, 243.53, 29/243.54, 243.56, 243.55; 227/51, 111

[56] References Cited

U.S. PATENT DOCUMENTS

| 303,968 | 8/1884 | Allen | 29/243.54 |
|---|---|---|---|
| 454,572 | 6/1891 | Sellers | 29/243.54 |
| 1,748,045 | 2/1930 | Jones | 29/243.55 |
| 2,317,224 | 4/1943 | Rylander | 29/243.54 X |
| 2,486,378 | 11/1949 | Aniot | 29/243.53 |
| 2,559,248 | 7/1951 | Harcourt | 29/243.53 |
| 3,534,896 | 10/1970 | Speller et al. | 227/51 |
| 3,536,316 | 10/1970 | DeVoss | 227/51 X |
| 4,662,556 | 5/1987 | Gidlund | 227/51 X |

FOREIGN PATENT DOCUMENTS

| 1008552 | 5/1957 | Fed. Rep. of Germany | 29/243.54 |
|---|---|---|---|
| 357846 | 1/1906 | France | 29/243.53 |
| 14868 | 11/1986 | United Kingdom | 29/243.53 |
| 812414 | 3/1981 | U.S.S.R. | 29/243.53 |

Primary Examiner—Charlie T. Moon
Attorney, Agent, or Firm—J. M. Cate; S. S. Sadacca

[57] ABSTRACT

A riveting apparatus includes a body pivotable about a horizontal axis and having first and second arms extending therefrom. Riveting structure is provided on the arms for cooperating to install and fasten rivets through a workpiece positioned between the riveting structure. The body may be rotated between a substantially horizontal to a substantially vertical position to accommodate riveting a workpiece having varying contours. The apparatus allows riveting operations to be performed at any point on the workpiece while permitting the operator to position himself immediately adjacent the point of riveting to assure proper alignment of the workpiece and proper riveting thereof.

12 Claims, 4 Drawing Sheets

VARIABLE ANGLE RIVETER

TECHNICAL FIELD

The present invention relates to an apparatus for installing rivets, and more particularly, for a riveting apparatus capable of installing rivets at varying position on large, contoured sheet components.

BACKGROUND ART

Devices for riveting sheet metal employing rivet retainers and bucking tools are well known in the art. Generally, these devices have means for retaining the metal parts in a predetermined position and for drilling a hole in the exact location through which a rivet will be placed. The hole may be countersunk so that the head may be flush with the surface of the part. Further, these devices have the rivet retainer and bucking tool located on opposite sides of the parts to be joined, which tools are pressed against the parts to assure a secure relation while the rivet is pressed.

The prior art discloses a rivet retainer and bucking tool located at the ends of arms, which arms serve to form an elongate space therebetween to receive elongate members of the parts being joined. An example of these devices is disclosed in U.S. Pat. No. 303,968 to Allen, which discloses a structure for performing riveting operations at the interior of large sheet metal parts.

Because rivets necessarily are fastened in a position normal to the surface of the parts being joined, parts having contoured surfaces require riveting devices providing means for the retainer and bucking tool to be rotated so that parts can be received and retained of the proper orientation, allowing riveting operations to be performed thereon. In particular, the prior art contemplates devices having their radius of rotation colinear with the rivet axis so that the riveting tools can receive horizontal sheet metal in its raised position, and vertical sheet metal in its lowered position. A device of this type is disclosed in U.S. Pat. No. 1,507,958 to Hansen, et al.

Similarly, the prior art contemplates retainer and bucking tools being rotatable about an axis of rotation located through the middle of the bucking tool to permit variable rivet angles in workpieces having large radii of curvature. An example of this type of device is disclosed in U.S. Pat. No. 3,534,896 to Speller, et al.

The variable angle riveters of the prior art require that the workpiece be mounted on a variable angle platform to permit rivets to be inserted at various angles. These platforms have the disadvantages of slippage of the workpiece during operation, requiring precise adjustment between riveting operations to assure the proper placement of successive rivets. Consequently, a need exists in the art for a variable angle riveter where successive rivets may be inserted at a desired position on a contoured surface without altering the angle of inclination of the part between riveting operations and to permit the part to be located on a horizontal platform to avoid the danger of part slippage. This need for a variable angle riveter which requires minimum adjustment of the workpiece between successive riveting steps is particularly felt in industries where workpieces are excessively large, heavy, or are otherwise difficult or cumbersome to handle.

A further need exists in the art for a riveting device which is capable of inserting rivets at varying positions on a contoured surface without major adjustment of the relation between the part and riveter. Yet a further need exists for a riveter of sufficient size to receive and rivet tubular parts having a diameter in excess of about 8 feet. In particular, a need exists in the aircraft industry for a riveter which can receive and rivet fuselage sections having variable compound surfaces and diameters in excess of 12 feet.

The variable angle riveters of the prior art also suffer the disadvantage of placing the workpiece and riveting tools in a position where the operator can not directly view the riveting operation. The prior art riveting devices require a two step process whereby the operator sights the proper location for the drilling step and then moves to a remote location to operate the machine. Consequently, a need exists for a variable angle riveter that permits riveting operations to be performed within the view of the operator.

SUMMARY OF THE INVENTION

The present invention comprises an apparatus for riveting large workpieces, having compound curved surfaces, at varying points on the contoured surfaces. In one embodiment of the invention, the apparatus comprises a body pivotable about a horizontal axis and having dual elongate arms extending therefrom. Riveting structure is mounted on the arms for cooperating to install and fasten rivets through the workpiece positioned between the riveting structure. Structure is provided for rotating the body between a substantially horizontal to a substantially vertical position to accommodate riveting of a workpiece having varying contours.

In accordance with a more specific embodiment of the invention, the body of the riveting apparatus has an arcuate track positioned thereon at a uniform radius from the horizontal axis of the body. The structure for rotating the body includes a motor and gear unit and arcuate gear rack attached to the body along the arcuate track thereof. The gear unit is operable to rotate the body about the horizontal axis.

The first arm of the apparatus is mounted on a dolly and the body further comprises retaining brackets for slidably receiving the dolly to permit movement thereof relative to the body. In this way, the distance between the first and second arms can be increased to permit insertion of the workpiece between the riveting structure or decreased to engage the workpiece between the riveting structure to permit riveting operations to be performed.

Control structure is provided for controlling the operation of the motor and gear unit and for determining the direction of operation of the motor and gear unit to control the direction of movement of the body.

A workpiece may be positioned between the riveting means with the arms in a desired position between horizontal and vertical as required to install and fasten rivets through the workpiece. With the body of the riveting apparatus pivoted with its arm substantially vertical, and with the longitudinal axis of the workpiece aligned substantially with the axis of the arms, the operator may position himself adjacent the riveting location even though long workpiece sections are riveted on the apparatus. In this way, the operator can directly view the surface being riveted to avoid the risk of improper rivet location. This arrangement also permits the drilling and riveting steps to be performed with the operator located in a single location while the workpiece is moved relative to the machine.

BRIEF DESCRIPTION OF THE DRAWINGS

For a more complete understanding of the present invention and further details and advantages thereof, reference is now made to the following Detailed Description taken in conjunction with the accompanying Drawings, in which:

FIG. 3b is a top view of the apparatus in the position shown in FIG. 3a;

FIG. 4b is a top view of the apparatus in the position shown in FIG. 4a.

DETAILED DESCRIPTION

Figure 1:
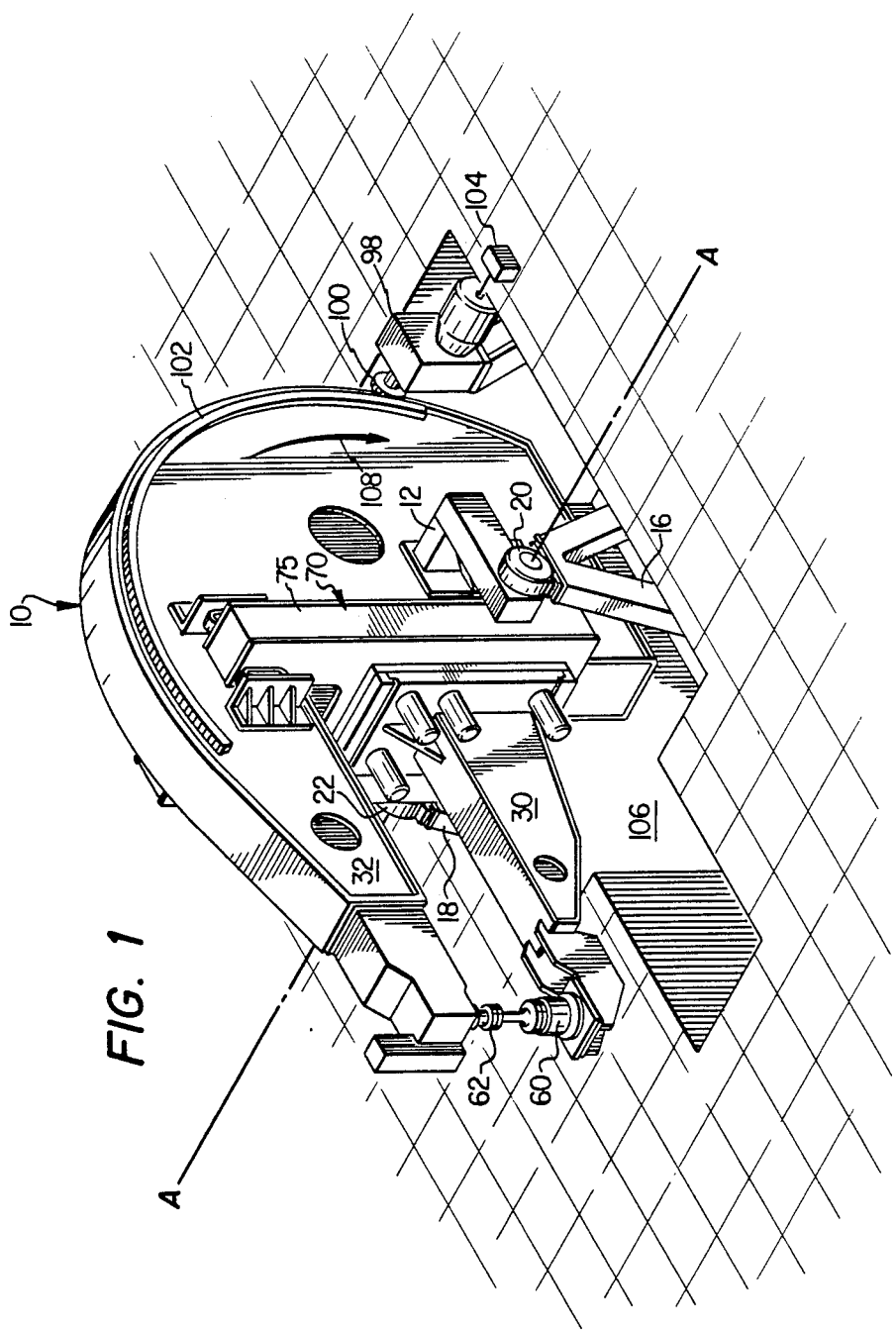
FIG. 1 is a perspective view of the apparatus of the present invention positioned in a horizontal orientation.

Referring initially to FIG. 1, the apparatus of the present invention includes a body 10 having dual supports 12 and 14 (FIG. 2b) extending from the sides thereof and rotatably mounted on A-frames 16 and 18, respectively. A-frames 16 and 17 are mounted on a suitable foundation and have appropriate bearing block assemblies 20 and 22 which receive shafts extending from supports 12 and 14 for rotative engagement therein.

Body 10 has dual elongate arms 30 and 32 extending therefrom. Arm 30 has a bucking tool 60 located at its end distant from the body, and arm 32 has a rivet retainer 62 located at its end distant from the body. Bucking tool 60 and retainer 62 oppose one another and serve to retain a workpiece between them to prohibit movement during the drilling operation and to perform the riveting operation. Arm 30 is attached to a dolly mechanism 70 which permits the arm to be raised or lowered relative to arm 32, thereby raising or lowering bucking tool 60 to the desired position in relation to rivet retainer 62. In one embodiment, rivet retainer 62 and bucking tool 60 may have structure to both retain a workpiece and perform drilling and riveting operations thereon. These tools may be used in conjunction with a laser light source (not shown) which illuminates the precise location of the drill bit to assure proper positioning of the drill hole and rivet.

Body 10 is rotated about axis A—A, defined through bearing block assemblies 20 and 22, by motor 98 and pinion 100 driven by motor 98. Support arms 12 and 14 are configured such that the axis A—A passes through a point proximate to the center of gravity of body 10 to assure easy rotation by operation of motor 98 and pinion 100. Pinion 100 engages an arcuate gear rack 102 mounted on body 10. Gear rack 102 is located at uniform radii from the axis of rotation. Motor 98 is controlled by a programmable controller 104. Through the controller, motor 98 and pinion 100 can be operated at various speeds in both the forward and reverse directions. Controller 104 also provides an on/off control mechanism which is user operated and can be preprogrammed to stop the movement of body 10 at any preselected angle of rotation. It will be understood that in various embodiments, motor 98 may be driven by electric, pneumatic, or hydraulic means, for example. Further, controller 104 may be linked to various electrical, pneumatic or hydraulic switches (not shown), which switches may serve to operate the motor and pinion in a predetermined manner, and may serve to limit the maximum degree of rotation of body 10.

Figure 2B:
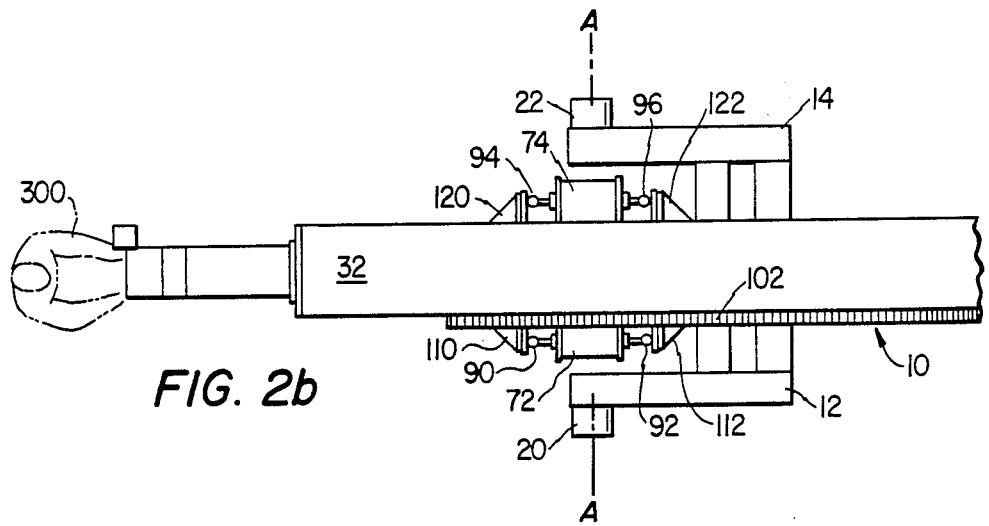
FIG. 2b is a top view of the apparatus of FIG. 1.
Figure 2A:
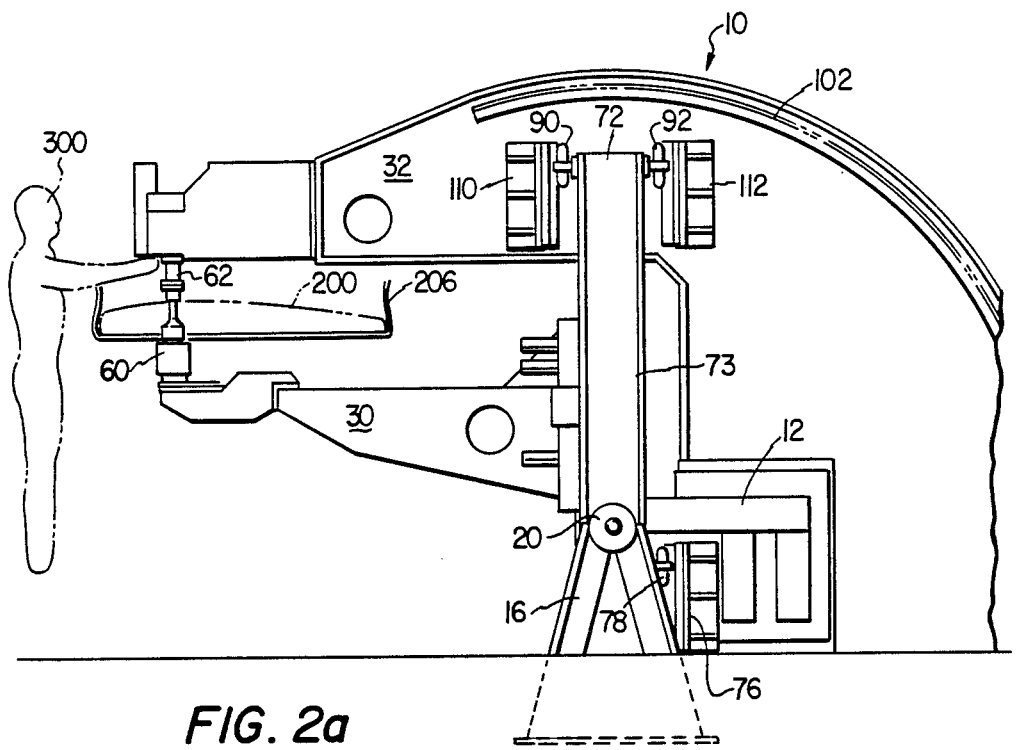
FIG. 2a is a side view of the apparatus of FIG. 1.
Figure 3B:
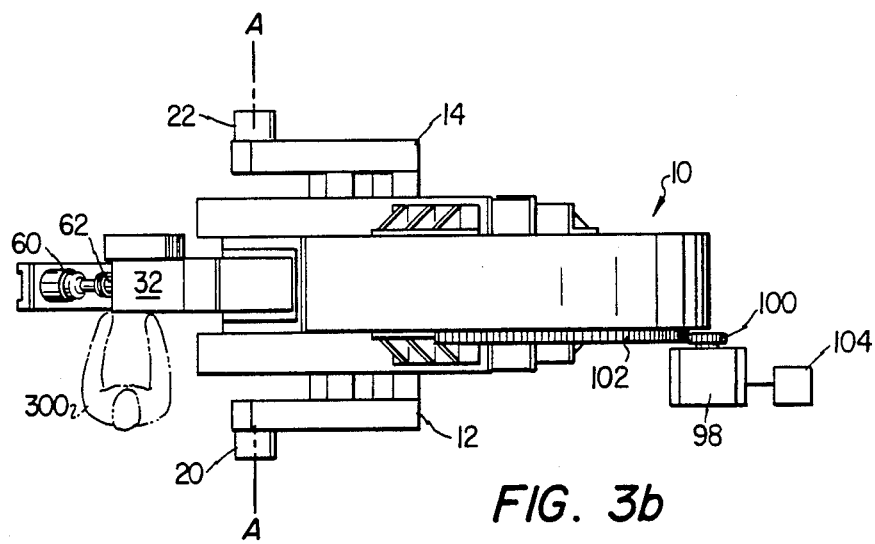
Figure 3A:
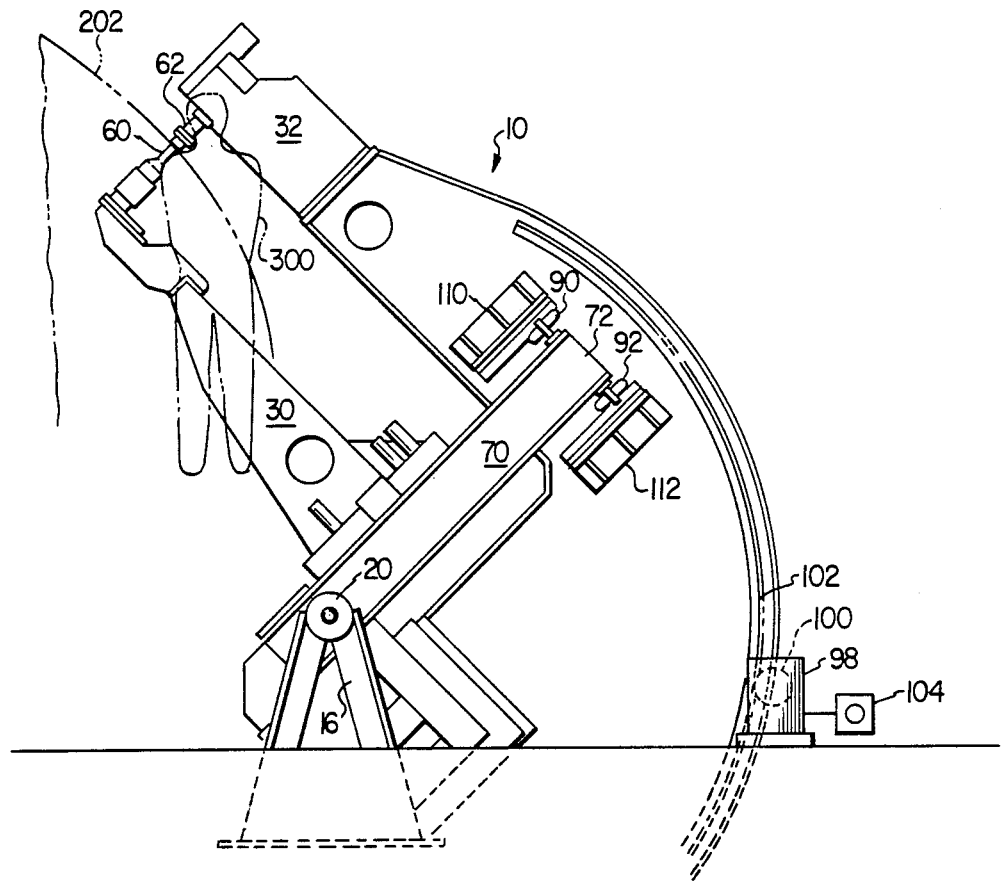
FIG. 3a is a side view of the apparatus of FIG. 1 showing the apparatus rotated partially upward.

Referring now to FIGS. 2a and 2b, the apparatus of the present invention is seen in a horizontal position with first arm 30 in a raised position to clamp workpiece 200 between rivet retainer 62 and rivet bucking tool 60. Arm 30 is connected to dolly mechanism 70 which is a box structure having a front plate 71 and a rear plate 73 separated by side plates 74. Mechanism 70 defines a pair of upwardly extending arms 72 and 74 (FIG. 2b) which straddle body 10 and are retained between plates 110 and 112, and 120 and 122, respectively, by roller bearing assemblies 90 and 92, and 94 and 96, respectively, disposed between the plates and arms. The lower end of dolly mechanism 70 is slidingly supported from body 10 by a similar arrangement, including a plate 76 and roller bearing assembly 78 (FIG. 2a). The position of arm 30 relative to arm 32 is controlled by an electrical, pneumatic or hydraulic means (not shown) which moves the dolly mechanism, and thus arm 30 attached thereto, relative to arm 32.

For all riveting operations, the rivet retainer and rivet bucking tool is located in positions so as to clamp and retain a workpiece between them. Arm 30 may be lowered sufficiently to allow insertion of a workpiece between the retainer and bucking tool. In particular, for large compound curved and contoured workpieces, the rivet retainer and bucking tool may be separated by a distance sufficient to allow insertion of the workpiece, and then brought together to clamp the workpiece therebetween. The system circuitry is designed such that motor 98 cannot be actuated during riveting operations. Thus, body 10 will be stationary during riveting.

The apparatus of the present invention is mounted in a pit 106 (FIG. 1) to allow passage of body 10 beneath the floor surface during operation. Arcuate gear rack 102 is of sufficient length, and pit 106 is of sufficient depth to allow body 10 to rotate through an angle of about 110° from the horizontal. It will be understood that modifications to gear rack 102 and pit 106 would permit body 10 to be rotated through angles in excess of 110°. As seen in FIG. 1, the direction of rotation from the horizontal is shown by arrow 108, and it will be understood that body 10 may be also rotated in the opposite direction. It will also be understood that where body 10 is to be rotated in the direction opposite that indicated by arrow 108 with arms 30 and 32 extending below horizontal, bearing support structure will be provided adjacent dolly mechanism 70 and opposite bearing assembly 78.

Figure 4B:
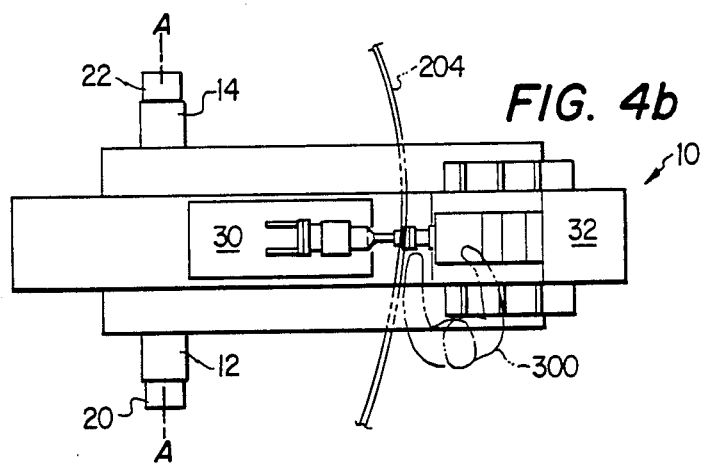
Figure 4A:
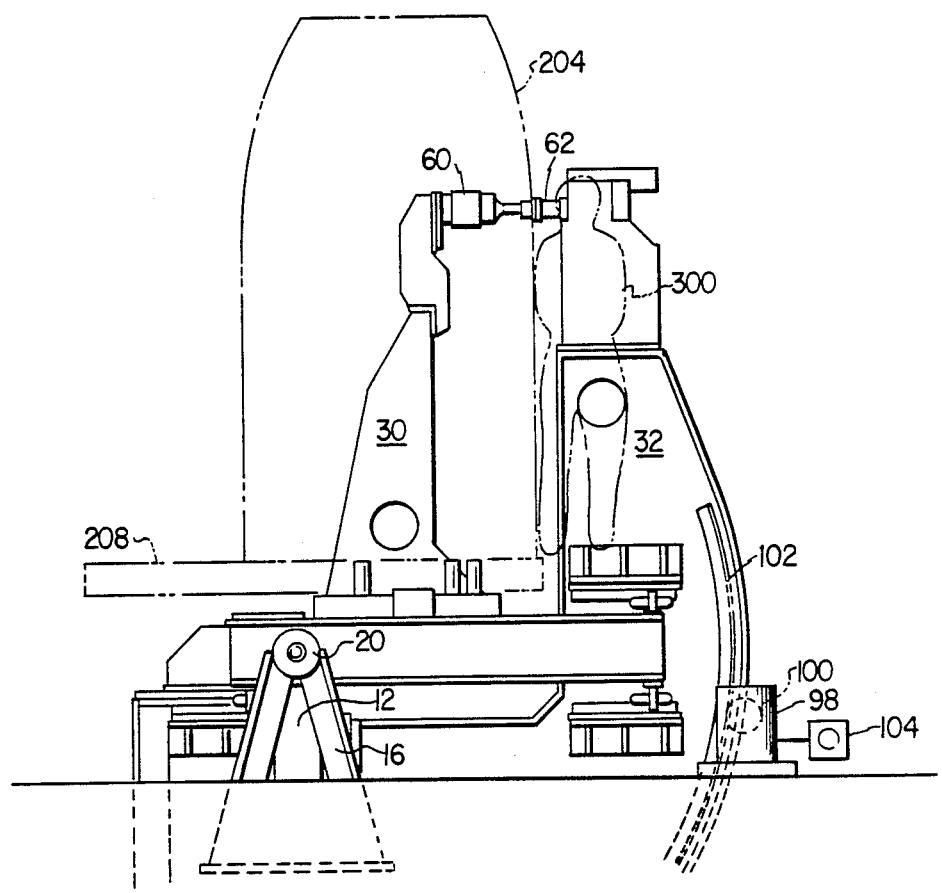
FIG. 4a is a side view of the apparatus of FIG. 1 showing the apparatus rotated to a vertical position.

As shown in FIGS. 3a, 3b, 4a, and 4b, the apparatus of the present invention may be rotated to various angles of inclination to allow various riveting operations to be performed on the compound curved surfaces of workpieces 202 and 204. It will be noted that at the various angles of elevation of the apparatus of the present invention, the operator 300 can position himself so that he will have direct visual sight of the location at which the rivet is to be placed. This is particularly the case when the apparatus is rotated to its vertical position, as shown in FIGS. 4a and 4b, and a tubular workpiece is inserted within the apparatus such that its longitudinal axis is also substantially vertical. As shown in FIG. 4a, the operator may position himself such that he is immediately adjacent to the riveting operation, even through large fuselage sections are being riveted using the apparatus.

It will be further understood that the apparatus of the present invention may be manually controlled by the operator, and the control panel (not shown) may be mounted on a flexible support so as to be adjustably mounted in a position adjacent the operator and within reach at all times. This aspect of the present invention is particularly useful in that the operator is in direct visual contact with the rivet location and need not move to a remote location to control the machine.

In operation, a workpiece is suspended from a movable sling 206 (FIG. 2a) or supported on a movable bed 208 (FIG. 4a) as is used in the art. Typically, the support bed of the prior art is substantially horizontal, and has means to adjust its angle of inclination in a precise manner, the adjustment means permitting minute adjustments to be made between riveting steps. The apparatus of the present invention provides the advantage of eliminating the necessity of making careful adjustments to the angular position of the support bed, and allows precise rivet location to be achieved by raising, lowering or rotating the workpiece and varying the angle of inclination of the apparatus of the present invention. It will understood, however, that a workpiece may be supported by any suitable means so long as it remains stable during riveting operations and is easily moved to permit riveting of various locations thereon.

During operation, the distance between rivet retainer 62 and bucking tool 60 is increased so as to allow insertion of the workpiece between them. Arm 30 is then moved toward arm 32 by moving dolly mechanism 70 causing bucking tool 60 to engage the workpiece against the rivet retainer. It will be understood that alignment and drilling operations may be performed at this time in accordance with the methods of the prior art. After a riveting operation has been performed, the part is unclamped by moving arm 30, and bucking tool 60 attached thereto, to a lower position and rotating the part on the support platform to a new riveting position, or if necessary, the horizontal bed may be raised or lowered to a new horizontal plane and the apparatus of the present invention rotated a predetermined degree to have access to any rivet location on the surface of the workpiece. It will be understood that it is not necessary to alter the disposition of the workpiece with respect to the horizontal to gain access to multiple riveting locations.

Generally, the apparatus of the present invention permits large aircraft fuselage sections to be positioned with their longitudinal axis in a vertical orientation and, using an appropriate support bed, allows rotation of the riveting and bucking tools to gain access to any point on the surface of the fuselage section. As has been referred to above, by permitting the fuselage section to be riveted while in a vertical orientation, the operator can position himself adjacent the point of riveting, and thus, can properly align the rivet retainer for accurate positioning of the rivet.

It will be understood, however, that the part may be initially disposed at any angle with respect to the horizontal, and that the angle of orientation of the work platform generally need not be altered during work operations, for any rivet point on a contoured surface can be reached by either raising, lowering, or rotating the part (without altering its angle of inclination) and simultaneously rotating the apparatus of the present invention through a predetermined required angle.

Although preferred embodiments of the invention have been described in the foregoing Detailed Description and illustrated in the accompanying Drawings, it will be understood that the invention is not limited to the embodiments disclosed, but is capable of numerous rearrangements, modifications, and substitution of parts and elements without departing from the spirit of the invention. The present invention is therefore intended to encompass such rearrangements, modifications, and substitution of parts and elements as fall within the scope of the invention.

We claim:

1. A riveting apparatus comprising:
   a body pivotable about a horizontal axis and having first and second arms extending therefrom;
   riveting means on said arms for cooperating to install and fasten a rivet through a workpiece positioned between said riveting means; support means supporting said body for pivoting about a horizontal axis of rotation, said support means being mounted on a base member; and
   means for rotating said body upwardly from a substantially horizontal position to an elevated position in which said arms extend above said horizontal axis and comprise means for receiving a workpiece above said horizontal axis and for accommodating riveting of a workpiece having varying contours.

2. The riveting apparatus according to claim 1 wherein said body may be rotated through an arc greater than 90°.

3. The riveting apparatus according to claim 1 further comprising:
   means for positioning said workpiece between said riveting means with said arms substantially vertical, said longitudinal axis of the workpiece being substantially parallel to the longitudinal axis of said arms.

4. The riveting apparatus according to claim 1 wherein said first arm is mounted on a dolly mechanism and said body further comprises retaining brackets for slidably receiving said dolly mechanism to permit movement of said dolly mechanism relative to the body such that the distance between said first and second arms may be increased to permit insertion of the workpiece between said riveting means or decreased to engage the workpiece between said riveting means to permit riveting operations to be performed thereon.

5. The riveting apparatus according to claim 4 wherein said dolly mechanism further comprises first and second extensions, and said body further comprises first and second bracket retainers for slidably engaging said first and second extensions, respectively, said riveting apparatus further comprising a drive means controlling the movement of said dolly relative to said body, said drive means permitting the distance between said first and second arms to be increased or decreased to receive and retain a workpiece therebetween.

6. A riveting apparatus comprising:
   a body pivotable about a horizontal axis and having first and second arms extending therefrom;
   riveting means on said arms for cooperating to install and fasten a rivet through a workpiece positioned between said riveting means; and
   means for rotating said body between a substantially horizontal to a substantially vertical position to accommodate riveting of a workpiece having varying contours wherein said body further comprises an arcuate track at a uniform radius from the horizontal axis of said body, and wherein said rotation means comprises a motor and gear unit and arcuate gear rack attached to said body along said arcuate track thereof, said motor and gear unit operable to rotate said body about said horizontal axis.

7. The riveting apparatus according to claim 6 further comprising a control means for controlling the operation of said motor and gear unit to position said body at any desired angular position between horizontal and 110° from horizontal.

8. A riveting apparatus comprising
  a body;
  first and second arms attached to said body and extending therefrom in a substantially parallel configuration, said first arm having a rivet bucking tool attached to the surface facing said second arm, and said second arm having a rivet retainer attached to the surface facing said first arm;
  a support means supporting said body for pivoting about a horizontal axis of rotation, said support means being mounted on a base member; and
  drive means for rotating said body about its axis of rotation to permit the disposition of said arms at an angle between horizontal and vertical, said drive means further comprising means for rotating said body to an elevated position in which said first and second arms extend upwardly, from said horizontal axis.

9. The riveting apparatus according to claim 8 wherein said drive means comprises a motor and gear unit and arcuate gear rack attached to said body, said gear unit operable to engage said gear rack to rotate said body about said horizontal axis.

10. The riveting apparatus according to claim 8 further comprising:
  means for positioning said workpiece between said retaining and bucking tools with said arms substantially vertical, said longitudinal axis of the workpiece being substantially in alignment with that of said arm.

11. The riveting apparatus according to claim 8 wherein said body further comprises an arcuate track at a uniform radius from the horizontal axis of said body, and wherein said rotation means comprises a motor and gear unit and arcuate gear rack attached to said body along said arcuate track thereof, said gear unit operable to rotate said body about said horizontal axis.

12. The riveting apparatus according to claim 8 wherein said first arm is mounted on a dolly mechanism and said body further comprises retaining brackets for slidably receiving said dolly mechanism to permit movement of said dolly mechanism relative to the body such that the distance between said first and second arms may be increased to permit insertion of the workpiece between said riveting means or decreased to engage the workpiece between said riveting means to permit riveting operations to be performed thereon.

* * * * *